(No Model.)
G. W. PRESSEY.
BROODER.
No. 328,860. Patented Oct. 20, 1885.
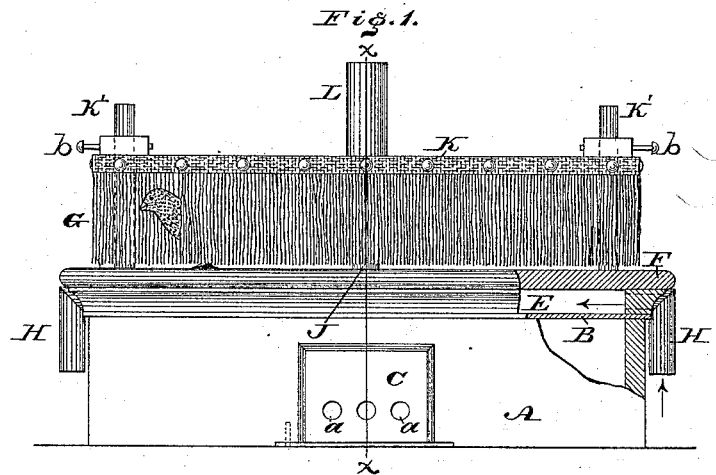
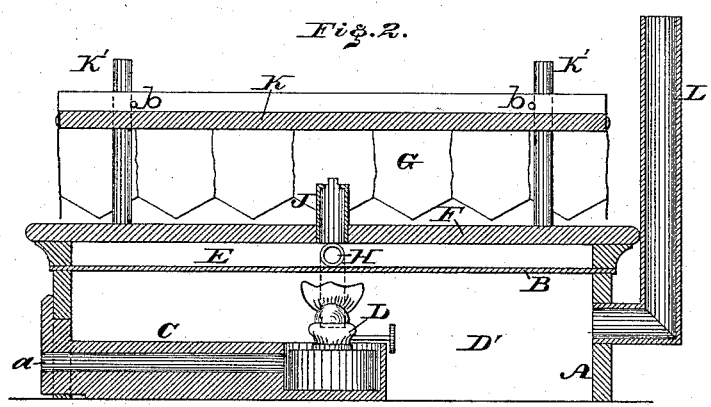
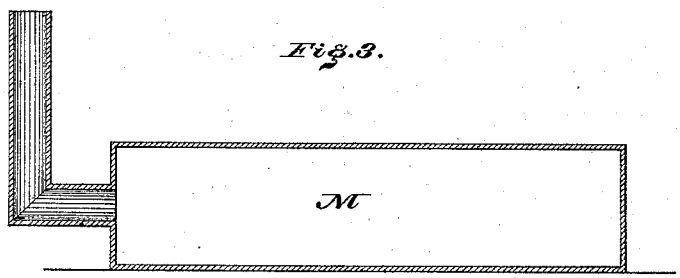
WITNESSES:
A. P. Grant
N. F. Kircher
INVENTOR:
George W. Pressey
BY Joshua Biedersheim
ATTORNEY.
N. PETERS, Photo-Lithographer, Washington, D. C.

UNITED STATES PATENT OFFICE.

GEORGE W. PRESSEY, OF HAMMONTON, NEW JERSEY.

BROODER.

SPECIFICATION forming part of Letters Patent No. 328,860, dated October 20, 1885.

Application filed October 1, 1884. Serial No. 144,407. (No model.)

*To all whom it may concern:*

Be it known that I, GEORGE W. PRESSEY, a citizen of the United States, residing at Hammonton, in the county of Atlantic, State of New Jersey, have invented a new and useful Improvement in Brooders, which improvement is fully set forth in the following specification and accompanying drawings, in which—

Figure 1 represents a side elevation, partly broken away, of a brooder embodying my invention. Fig. 2 represents a vertical section thereof in line $x$ $x$, Fig. 1. Fig. 3 represents a vertical section of a hot-water chamber that may be employed for heating the artificial mother.

Similar letters of reference indicate corresponding parts in the several figures.

My invention consists of a brooder having a heater constructed substantially as hereinafter fully set forth, whereby the artificial mother may be heated, supplied with fresh air, and ventilated in a thorough and uniform manner, and other advantages are presented, as will be hereinafter fully set forth.

Referring to the drawings, A represents a stand having a roof, B, which is formed of metal.

C represents a box or holder for a lamp, D, the same being fitted to one of the sides of the stand, so as to be moved in and out, the lamp being so disposed within the lamp-chamber D' that its flame or heat impinges against the under side of the top B, thus heating the same.

E represents an air-chamber, which is formed by the roof B of the stand A and the floor F of the artificial mother G, said floor being supported above said roof and having its sides closed, so that heat directed into the chamber E is prevented from escaping at said sides.

H represents a pipe, which is connected with the side of the chamber E, for directing fresh air into the latter, and J represents a pipe connected with the floor F, for directing air into the artificial mother. Elevated above the floor F is the cover K of the artificial mother, to the sides of which are affixed pieces of notched fabric, fringe, &c., as curtains, which permit the chickens to pass in and out of the artificial mother as they would under the mother hen, and in a measure close the sides of the same.

The lamp-box C is somewhat of the form of a drawer, and has longitudinally-extending ducts $a$, which are open in front and rear, so as to direct atmospheric air to the lamp.

L represents a pipe, which is connected with the side of the stand A, for carrying off the vapor and smoke generated by the lamp.

When it is desired to employ hot water as the heating medium, the same is contained in a chamber, M, the latter being fitted within the stand A, so that the heat will reach the roof B, in which case the lamp and lamp-holder are dispensed with. It will be seen that when the roof is heated the air-chamber E is also heated, and the hot air rises through the pipe J into the artificial mother, and is diffused through the same, so that all parts of said mother are nicely and uniformly warmed or heated. Owing to the pipe H, fresh air is constantly admitted into the chamber E, and thus pure warm or hot air is supplied to the artificial mother. As the sides of the artificial mother are open, provision is made for ventilating the same, and thus the mother is kept clean and healthy, the heat rapidly drying all excrementitious matter, so that it can be readily scraped or brushed off from the floor. Furthermore, the floor is made of wood, and as it is the top of the air-chamber E, it is a non-conductor of heat, and thus the feet of the chicken are prevented from being burned. The cover K is supported on posts K', which are freely passed through said cover, so that the latter may be raised or lowered according to the sizes of the chickens or requirements of the case, said cover being retained in its adjusted position by means of pins $b$, which are passed through the cover and enter openings or notches in the posts, so as to prevent the cover from falling.

In lieu of the pins $b$, I may thread the posts and employ nuts, which are fitted to the posts on opposite sides of the cover.

Having thus described my invention, what I claim as new, and desire to secure by Letters Patent, is—

1. The floor F of the brooder, provided with vertical posts K' K', in combination with the top K, provided with side curtains, and having an opening at each end to fit over said posts, and pins $b$ $b$, for securing said top in the desired position, substantially as described.

2. A brooder having an artificial mother provided with a vertically-adjustable roof, side curtains, and a non-conducting floor, a hot-air chamber having inlet and outlet pipes, the outlet-pipe leading into the said artificial mother, and a heating-chamber, said parts being combined substantially as set forth.

3. A brooder composed of the stand A, having the metallic roof B and outlet-pipe L, and provided with the drawer C, the hot-air chamber E, having pipes H and J, the artificial mother G, having the adjustable roof K, and posts K' and side curtains, all of said parts being arranged and combined substantially as and for the purpose set forth.

GEORGE W. PRESSEY.

Witnesses:
JOHN A. WIEDERSHEIM,
A. P. GRANT.